INVENTORS:
MICHAEL GRASER, JR.
HENRY J. VANDERLAAN,

THEIR ATTORNEY.

Nov. 3, 1970  M. GRASER, JR., ET AL  3,538,249
DEFORMABLE MEDIUM PROJECTION APPARATUS
Filed Oct. 5, 1965  5 Sheets-Sheet 3

INVENTORS:
MICHAEL GRASER, JR.
HENRY J. VANDERLAAN,

BY *Julius J. Zashchuky*
THEIR ATTORNEY.

Nov. 3, 1970    M. GRASER, JR., ET AL    3,538,249
DEFORMABLE MEDIUM PROJECTION APPARATUS
Filed Oct. 5, 1965    5 Sheets-Sheet 5

INVENTORS:
MICHAEL GRASER, JR.
HENRY J. VANDERLAAN,

BY
THEIR ATTORNEY.

United States Patent Office 3,538,249
Patented Nov. 3, 1970

3,538,249
DEFORMABLE MEDIUM PROJECTION
APPARATUS
Michael Graser, Jr., Fayetteville, and Henry J. Vanderlaan, Liverpool, N.Y., assignors to General Electric Company, a corporation of New York
Filed Oct. 5, 1965, Ser. No. 493,139
Int. Cl. H04n 5/74
U.S. Cl. 178—7.5                          5 Claims

ABSTRACT OF THE DISCLOSURE

The guard bands in the schlieren optics in a light valve projector are made variable to provide improved brightness and resolution without comprising the blocking function thereof.

---

The present invention relates to improvements in apparatus for the projection of images of the kind including a viscous light modulating medium deformable into diffraction gratings by charge deposited thereon in accordance with electrical signals corresponding to the images.

One form of such apparatus comprises a pair of light masks including similar arrays of transparent and opaque portions, for example, parallel transparent slots and parallel opaque bars, a light modulating medium of the character indicated located between the light masks, and a source of light. Such apparatus usually includes the following lens systems:

(1) A first system for directing light from the source through the openings of the first or input one of said masks onto the light modulating medium, (2) A second system for imaging the light passed by the transparent portions of the first mask onto corresponding opaque portions of the second or output mask, and (3) A third system for projecting an image of the light modulating medium on a screen.

In the absence of deformations in the modulating medium light from the source is blocked by the output mask and does not reach the screen. When the surface of the light modulating medium is deformed by the deposition of an electron charge pattern thereon in response to electrical signals corresponding to an image to be projected, light incident on the medium is diffracted and passes through the transparent portions in the output mask onto the screen to form an image corresponding to the electrical signals.

In one system for the projection of three primary colors, for example red, blue and green, a plurality of diffraction gratings are formed on the light modulating medium. One set of grating lines are formed parallel to the direction of electron beam scan and the two other diffraction gratings are formed orthogonal thereto. Correspondingly the slots of the input mask and the bars of the output mask associated with the green channel are oriented parallel thereto. Also the slots of the input mask and bars of the output mask associated with the red and blue channels are oriented parallel to the corresponding grating lines and orthogonal to the direction of horizontal beam scan. In the absence of deformations associated with the green channel light from the green input slots passing through the light modulating medium is imaged on the bars of the light output mask and no light passes on to the screen. Also in the absence of deformation associated with the red and blue diffraction gratings in the light modulating medium light from the red and blue slots of the input mask are imaged on to corresponding bars of the light output mask and no light passes on to the screen. When deformations are produced in the light modulating medium in response to electrical signals corresponding to the green, red and blue color components, deviations are produced in the light incident on the diffraction gratings which cause the appropriate light to be passed onto the screen.

In such a system light filtering and focusing elements direct red and blue light from a source of white light through the light modulating medium onto the appropriate opaque and transparent portions of the light output mask cooperatively associated with the red and blue diffraction gratings formed in the light modulating medium to produce the desired operation explained above and direct green light from the source of white light through the common area of the light modulating medium and onto appropriate opaque and transparent portions which are cooperatively associated with the green diffracting grating formed in the light modulating medium. A single electron beam of substantially constant current is directed onto the light modulating medium and is scanned horizontally and vertically over the active area of the light modulating medium to form a raster thereon. The three diffraction gratings are formed on the raster area by appropriate modulation of the electron beam. The red and blue diffraction gratings may be formed by appropriate velocity modulation of the electron beam in the direction of horizontal scan and the natural grating formed by the horizontal scan of the electron beam serves as the green diffraction grating. If it is desired to project images in monochrome either the red and blue channel or green channel may be used for such purpose. One system for the projection of images in monochrome is described and claimed in U.S. patent application Ser. No. 419,396, filed Dec. 18, 1964, now Pat. 3,308,230, and assigned to the assignee of the present invention.

In such color and monochrome systems as described above the second lens system images a slot of the first or input mask onto a respective opaque bar of the second or output mask. The bar is made of sufficient width to block the zero order image. Extensions or guard bands are provided in the bar extending the bar beyond the portion on which the zero order image is imaged to block undesired light from passing beyond the mask due to unavoidable inaccuracies in the construction and alignment of the components of the mask and lens system. Heretofore each of the slots in the input mask of a specific orientation were made the same width and each of the bars in the output mask of a specific orientation were made the same width. We have found that by appropriately proportioning the input slots and output bars that undesired light, i.e., zero order light, is effectively blocked to provide a good dark field and at the same time the efficiency of transmission of light through the optical system is improved. We have found that the aberrations produced by the lens system are greater for points in the object plane thereof which are at greater distances from the axis of the lens system. Accordingly, we have proportioned the input slots and the output bars so as to allow for these differences, and thus in effect the guard bands provided in the output mask to block deviations and aberrations of zero order light are no wider than absolutely necessary. In effect, this means that the extensions or guard bands provided on the output opaque bars are smaller for bars positioned closer to the optical axis of the system, or conversely the light sources more remote from the axis of the optical system are narrower where bars of constant width are used in the output mask.

The novel features believed to be characteristic of the invention are set forth in the appended claims. The invention itself, together with further objects and advantages thereof, may best be understood by the following description taken in connection with the following drawings in which:

Figure 1:
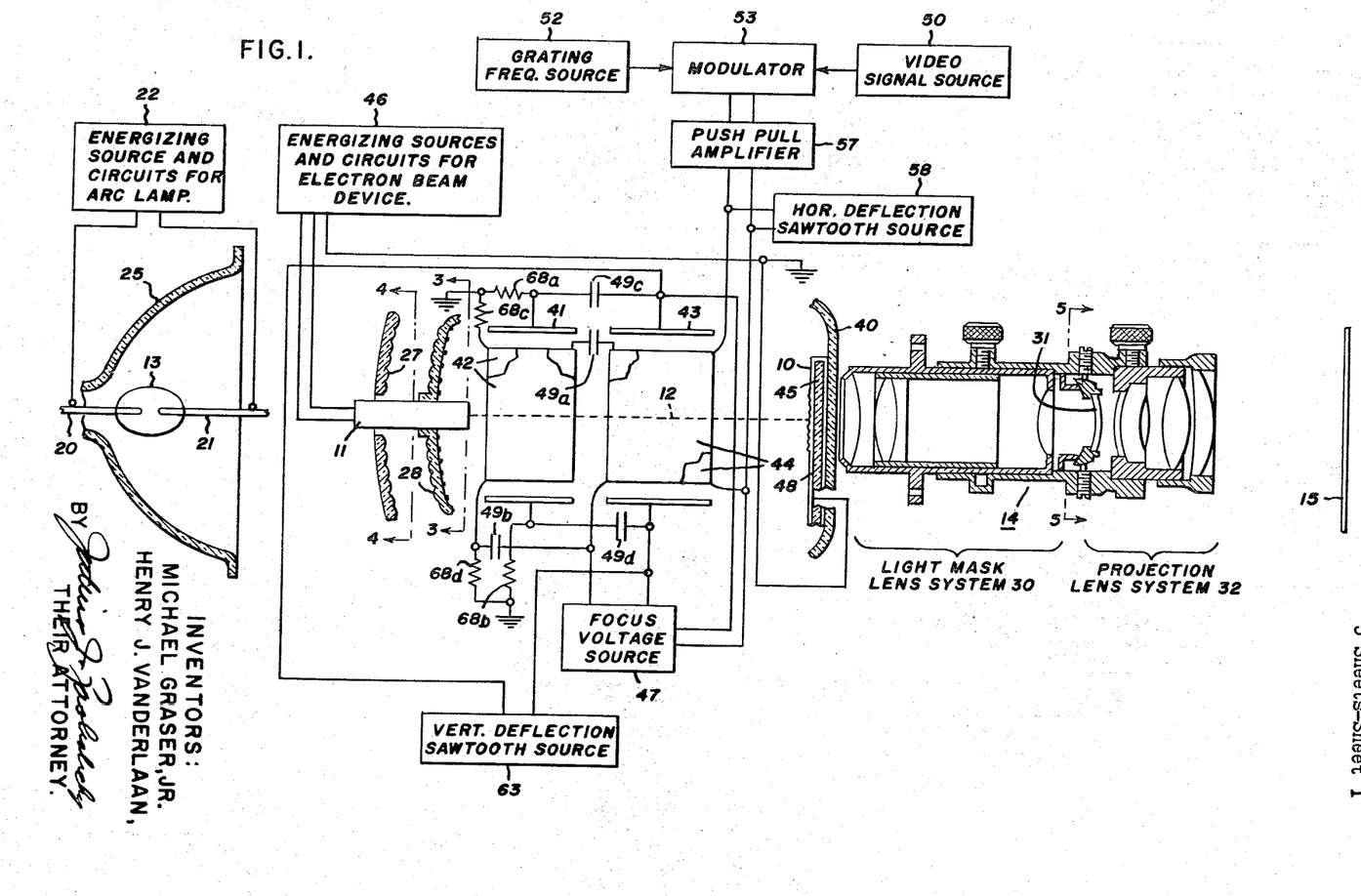
FIG. 1 is a schematic diagram of the optical and electrical elements of a system useful in explaining the present invention.

Referring now to FIG. 1 there is shown a monochrome projection system comprising an optical channel including a light modulating medium 10, and an electrical channel including an electron beam device 11, the electron beam 12 of which is coupled to the light modulating medium 10 in the optical channel. Light is applied from a source of light 13 through a plurality of beam forming and modifying elements onto the light modulating meduim 10. In the electrical channel electrical signals varying in magnitude in accordance with the point by point variation in light intensity of an image to be projected are applied to the electron beam device 11 and modulate the beam thereof in the manner to be more fully described below, to produce deformations in the light modulating medium which modify the light transmitted by the modulating medium in point by point correspondence with the image to be projected. An apertured light mask and projection lens system 14, which may consist of a plurality of lens elements, on the light output side of the light modulating medium function to cooperate with the light modulating medium to control the light passed by the optical channel and also to project such light onto a screen 15 thereby reconstituting the light in the form of an image.

More particularly, on the light input side of the light modulating medium 10 are located the source of light 13 consisting of a pair of electrodes 20 and 21 between which is produced white light by the application of voltage therebetween from source 22, an elliptical reflector 25 positioned with the electrodes 20 and 21 located at the adjacent focus thereof, a first lens plate member 27 of generally circular outline which consists of a plurality of lenticules stacked in a horizontal and vertical array, a second lens plate and input mask member 28 of generally circular outline also having a plurality of lenticules on one face thereof stacked in horizontal and vertical array, and the input mask on the other face thereof. The elliptical reflector 25 is located with respect to the light modulating medium 10 such that the latter appears at the other or remote focus thereof. The input mask portion of member 28 includes a plurality of vertically extending transparent slots between which are located a plurality of vertically extending opaque bars. The first plate member 27 functions to convert effectively the single arc source 13 into a plurality of such sources corresponding in number to the number of lenticules on the lens plate member 27, and to image the arc source on individual separate elements of the transparent slots in the input mask portion of member 28. Each of the lenticules on the lens plate portion of member 28 images a corresponding lenticule on the first plate member onto the active area of the light modulating medium 10. With the arrangement described efficient utilization is made of the light from the source, and also uniform distribution of light is produced on the light modulating medium.

On the light output side of the light modulating medium are located a mask imaging lens system 30 which may consist of a plurality of lens elements, and output mask member 31 and a projection lens system 32. The output mask member 31 has a plurality of parallel vertically extending transparent slots separated by a plurality of parallel vertically extending opaque bars. In the absence of deformations in the light modulating medium 10, the mask lens system 30 images light from each of the slots in the input mask member 28 onto corresponding opaque bars on the output mask member 31. When the light modulating medium 10 is deformed, light is deflected or deviated by the light modulating medium, passes through the slots in the output mask member 31, and is projected by the projection lens system 32 onto the screen 15. The details of the light input optics of the light valve projection system shown in FIG. 1 are described in a copending patent application Ser. No. 316,606, filed Oct. 16, 1963, now Pat. 3,330,908, and assigned to the assignee of the present invention.

The output mask lens system 30 comprises four lens elements which function to image light from the slots in the input mask onto corresponding portions of the output mask in the absence of any physical deformation in the light modulating medium. The projection lens system 32 in combination with the light mask lens system 30 comprises a composite lens system for imaging the light modulating medium on a distant screen on which an image is to be projected. The projection lens system 32 comprises five lens elements. The plurality of lenses are provided in the light mask and projection lens system to correct for the various aberrations in a single lens system. The details of the light mask and projection lens system are described in patent application Ser. No. 336,505, filed Jan. 8, 1964, now Pat. 3,328,111, and assigned to the assignee of the present invention.

According to present day color television standards in force in the United States an image to be projected by a television system is scanned horizontally once every $\frac{1}{15,735}$ of a second by a light-to-electrical signal converter, and vertically at a rate of one field of alternate lines every one-sixtieth of a second. Correspondingly, an electron beam of a light producing or controlling device is caused to move at a horizontal scan frequency of 15,735 cycles per second in synchronism with the scanning of the light converter, and to form thereby images of light varying in intensity in accordance with the brightness of the image to be projected. The pattern of scanning lines, as well as the area of scan, is commonly referred to as the raster.

Figure 2A:
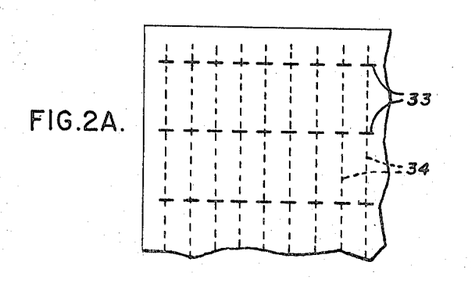
FIGS. 2A and 2B are a diagrammatic representation of the active area of the light modulating medium showing the horizontal scan lines and the location of charge with respect thereto for the monochrome channel of the system.
Figure 2B:
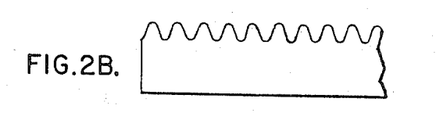

In FIG. 2A is shown in schematic form a portion of such a raster in the light modulating medium along with the diffraction grating used to deviate light. The size of the raster or whole area scanned in the embodiment is approximately 0.82 of an inch in height, and 1.10 of an inch in width. The horizontal dash lines 33 are the alternate scanning lines of the raster appearing in one of the two fields of a frame. The spaced vertically oriented dotted lines 34 on each of the raster lines, i.e., extending across the raster lines schematically represent concentrations of charge laid down by an electron beam to form the diffraction grating in a manner to be described hereinafter, such concentrations occurring at equally spaced intervals on each line, corresponding parts of each scanning line having similar concentrations thereby forming a series of lines of charge equally spaced from adjacent lines which cause the formation of valleys in the light modulating medium, the depth of such valleys, of course, depending upon the concentration of charge. Such a wave is produced by a signal superimposed on an electron beam moving horizontally at a frequency 15,735 cycles per second, a carrier wave, of smaller amplitude but of fixed frequency of the order of 4 megacycles per second. The high frequency carrier wave causes a velocity modulation of the beam thereby causing the beam to move in steps, and hence to lay down the pattern of charge schematically depicted in this figure with each valley extending in the vertical direction and adjacent valleys being spaced apart by a distance determined by the carrier frequency as shown in greater detail in FIG. 2B which is a side view of FIG. 2A.

Phase diffraction gratings have the property of deviating light incident thereon, the angular extent of the deviation being a function of the line to line spacing of the grating and also of the wavelength of light. For a particular wavelength a large line to line spacing would produce less deviation than a small line to line spacing. Also for a particular line to line spacing short wavelengths of light are deviated less than long wavelengths of light. Phase diffraction gratings also have the property of transmitting deviated light in varying amplitude in response to the amplitude or depth of the lines or valleys of the grating. Accordingly it is seen that the phase diffraction grating is useful for the point by point control of the intensity of a beam of light. In the specific system under consideration herein substantially the first and second diffraction orders of light are utilized. The manner in which the instantaneous efficiency of the first, second and third orders vary with depth of deformation, and also the manner in which the sums of various ones of the orders varies with depth of deformation are described in connection with FIGS. 6 and 7. The manner in which the average efficiency for combinations of various ones of the first, second and third orders varies with depth of deformation will be described in detail in connection with FIG. 8.

Referring now to FIG. 1, an electron writing system is provided for producing the phase diffraction gratings in the light modulating medium, and comprises an evacuated enclosure 40 in which are included an electron beam device 11 having a cathode (not shown), a control electrode (not shown), and a first anode (not shown), a pair of vertical deflection plates 41, a pair of horizontal deflection plates 42, a set of vertical focus and deflection electrodes 43, a set of horizontal focus and deflection electrodes 44, and the light modulating medium 10. The cathode, control electrode, and first anode along with the transparent target electrode 48 supporting the light modulating medium 10 are energized from a source 46 to produce in the evacuated enclosure an electron beam that at the point of focusing on the light modulating medium is of small dimensions (of the order of a mil), and of low current (a few microamperes), and high voltage. Electrodes 41 and 42, connected to ground through respective high impedances 68a, 68b, 68c, and 68d provide a deflection and focus function, but are less sensitive to applied deflection voltages than electrodes 43 and 44. The electrodes 43 and 44 control both the focus and deflection of the electron beam in the light modulating medium in a manner to be more fully explained below.

A carrier wave which produces the grating, in addition to the horizontal deflection voltage are applied to the horizontal deflection plates 42. The electron beam, as previously mentioned, is deflected in steps separated by distances in the light modulating medium which are a function of the grating spacing of the diffraction grating. The period of hesitation at each step is a function of the amplitude of the applied video signal. The vertical sweep voltage is applied to the vertical deflection plates 41. The viscous light modulating medium 10 is supported on transparent member 45 coated with a transparent conductive layer 48 adjacent the medium such as indium oxide. The viscosity and other properties of the light modulating medium are selected such that the deposited charges produce the desired deformations in the surface and such that the amplitude of the deformations decay to a small value after each field of scan thereby permitting alternate variations in amplitude of the diffraction grating at the sixty cycle per second field scanning rate. The conductive layer 48 is maintained at ground potential and constitutes the target electrode for the electron writing system. Of course, in accordance with television practice the control electrode is also energized after each horizontal and vertical scan of the electron beam by a blanking signal obtained from a conventional blanking circuit (not shown).

Above the evacuated enclosure 40 are shown in functional blocks the source of the horizontal deflection and beam modulating voltages which are applied to the horizontal deflection plates to produce the desired horizontal deflection.

Below the evacuated enclosure 40 are shown in block form the vertical deflection source from which voltages are applied to the vertical deflection plates to produce the desired vertical deflection. The output from the vertical deflection source is applied in push-pull to the vertical plates to produce vertical deflection of the electron beam in the manner previously indicated. The output of the vertical deflection sawtooth source is also applied to the plates 43 and to plates 41 through capacitors 49c and 49d.

A circuit for accomplishing the deflection and focusing functions described above in conjunction with the deflection and focusing electrode system comprising two sets of four electrodes such as shown in FIG. 1 is shown and described in a copending patent application Ser. No. 335,117, filed Jan. 2, 1964, now abandoned, and Ser. No. 471,993, filed July 14, 1965, now Pat. No. 3,320,468, both assigned to the assignee of the present invention.

The raster area of the modulating medium may be rectangular in shape and has a ratio of height to width or aspect ratio of three to four in accordance with television standards in force in the United States. The center-to-center spacing of the slots in the horizontal array is made three-fourths the center-to-center spacing of the slots in the vertical array. Each of the lenticules in each of the lenticular plates are also so proportioned, i.e., with height to width ratio of three to four. The lenticules in each plate are stacked into horizontal rows and vertical columns. Each of the lenticules in one plate are of one focal length and each of the lenticules on the other plate are of another focal length.

Figure 3:
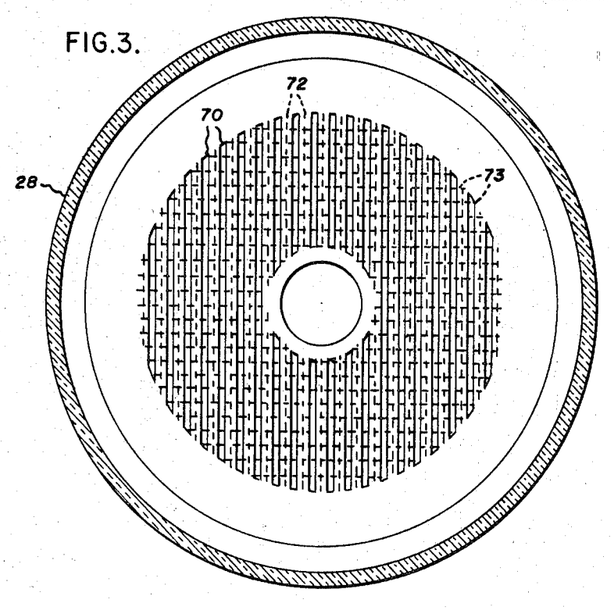
FIG. 3 is an end view taken along section 3—3 of the system of FIG. 1 showing the second lenticular lens plate and the input mask thereof of the system of FIG. 1.

In FIG. 3 is shown a view of the face of the second lenticular lens plate and the input mask 28 as seen from the raster area of the modulating medium or along section 3—3 of FIG. 1. In this figure the vertically oriented transparent slots 70 are utilized for providing slot sources of light for the system. The rectangular areas enclosed by the vertical and horizontal dash lines 72 and 73 are boundaries for the individual lenticules appearing on the opposite face of the plate 28. The focal length of each of the lenticules is the same. The center of each of the lenticules lies in the center of an element of a corresponding slot.

Figures 4, 5:
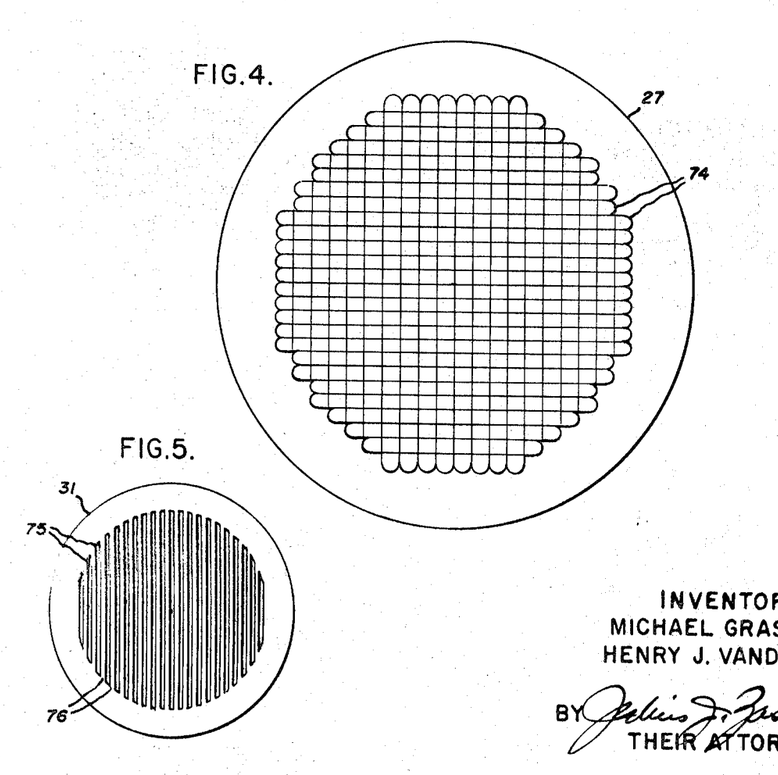
FIG. 4 is an end view taken along section 4—4 of the system of FIG. 1 showing the first lenticular lens plate thereof.
FIG. 5 is an end view taken along section 5—5 of the system of FIG. 1 showing the light output mask thereof.

FIG. 4 shows the first lenticular lens plate 27 taken along section 4—4 of FIG. 1 with horizontal rows and vertical columns of lenticules 74. Each of the lenticules on this plate cooperates with a correspondingly positioned lenticule on the second lenticular lens plate shown in FIG. 3 in the manner described above. Each of the lenticules on plate 27 have the same focal length which is different from the focal length of the lenticules on the second lenticular plate 28.

FIG. 5 shows the light output mask 31 of FIG. 1 taken along section 5—5 thereof. This mask consists of a plurality of vertically extending transparent slots 75 and opaque bars 76. As mentioned previously the slots and bars from the output mask are in a predetermined relationship to the slots and bars of the input mask.

Figure 6:
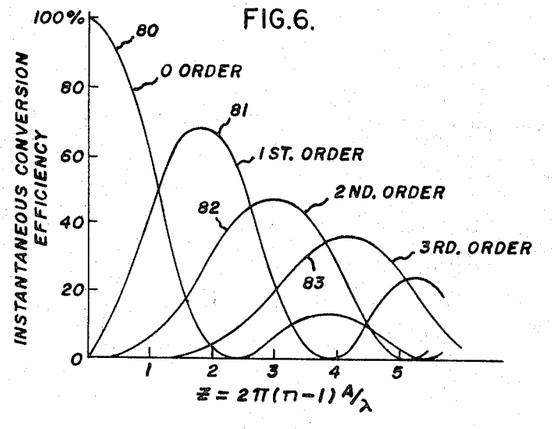
FIG. 6 shows graphs of the instantaneous conversion efficiency of the light diffracting gratings formed in the light modulating medium as a function of the depth of modulation or deformation for various diffraction orders.

Referring now to FIG. 6 there are shown graphs of the instantaneous conversion efficiency of the light diffracting grating formed in the light modulating medium as a function of the depth of modulation or deformation of the light modulating medium for various diffraction orders. In this figure instantaneous conversion efficiency for light directed on to the light modulating medium is plotted along the ordinate in percent and the deformation function Z, where $$Z = 2\pi(n-1)\frac{A}{\lambda}$$

is plotted along the abscissa. In the above relationship A represents the peak amplitude or depth of deformation, $\lambda$ represents the wavelength of light involved, and $n$ represents the refractive index of the light modulating medium. Graphs 80, 81, 82 and 83 show such relationships for the zero, the first, the second, and the third orders of diffracted light, respectively. In connection with this figure it is readily observed that when the light modulating is undeformed that all of the light is concentrated in the zero order which represents the undiffracted path fo light. Of course, the light passing through the light modulating medium would be deviated slightly by refraction of the light modulating medium as normally the index of refraction of the light modulating medium is different from the index of refraction of vacuum or air surrounding the medium, and is conveniently selected to be approximately in the range of refraction of indices of the material of the various vitreous optical elements utilized in the system. The output mask is positioned in relationship to the input mask such that when the light modulating medium is undeformed the slots of the input mask are imaged on the bars of the output mask and thus the slight refraction effects that occur are allowed for. Allowance is also made for unavoidable devices due to tolerances of components used and slight misalignments in the system as well as for aberrations produced by the lens system. As the depth of modulation for a given grating is increased, progressively more light appears in the various diffraction orders higher than the zero order. Progressively as the peak efficiency of the first, second and higher orders of light is reached the value of the maximum efficiency of the higher order of light becomes progressively smaller. As can be readily seen from the graphs the maximum efficiencies of light in the first order, second and third orders is approximately 67 percent, 47 percent, and 37 percent, respectively.

Figure 7:
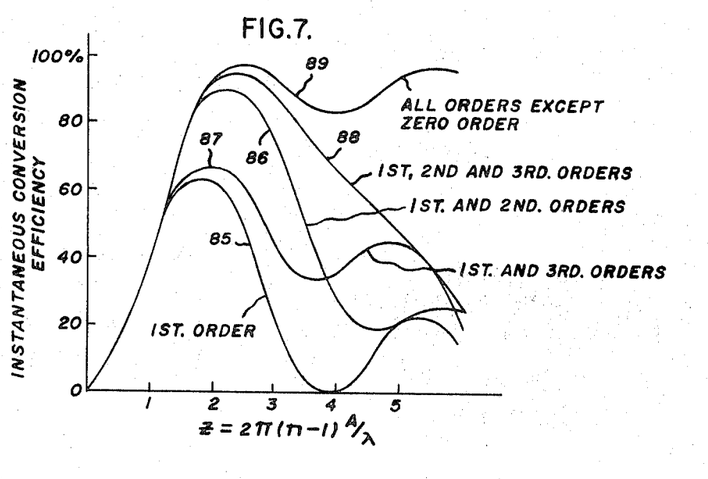
FIG. 7 shows graphs of the instantaneous conversion efficiency of the light diffracting gratings formed in the light modulating medium as a function of the depth of modulation or deformation for various combinations of diffraction orders.

In FIG. 7 are shown graphs of the instantaneous conversion efficiency versus Z the function of the depth of modulation set forth above, for various combinations of diffraction orders. In this figure instantaneous conversion efficiency is plotted in percent along the ordinate, and the parameter Z is plotted along the abscissa. Graph 85 shows the manner in which the instantaneous conversion efficiency of the first order increases when the depth of modulation reaches a peak at approximately 67 percent and thereafter declines. Graph 86 shows the manner in which the instantaneous conversion efficiency for the sum of the first and second order of diffracted light increases reaching a peak at approximately 93% and thereafter declines. Similarly, graph 87 shows the manner in which the instantaneous conversion efficiency of the diffraction grating varies for the sum of the first and third orders increases reaches a peak of approximately 69% and thereafter declines. Finally, graph 88 shows the manner in which the instantaneous conversion efficiency of the sums of the first, second and third orders of light increases to a peak of approximately 98% and thereafter declines. Graph 89 shows instantaneous conversion efficiency of the sum of all orders except the zero order.

Figure 8:
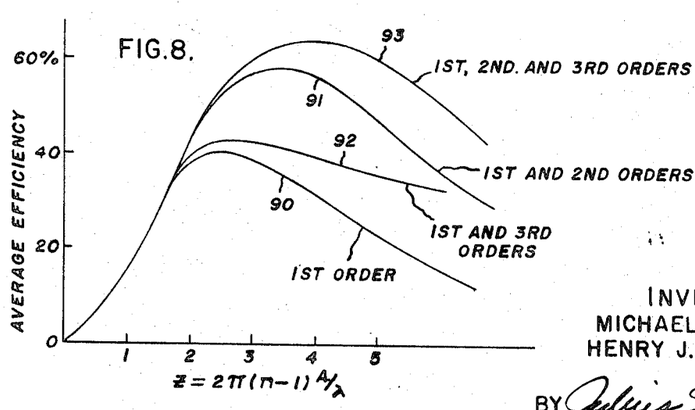
FIG. 8 shows graphs of the average efficiency for linear decay of the light diffraction gratings formed in the light modulating medium as a function of the depth of modulation or deformation for various combinations of diffraction orders.

In FIG. 8 are shown a group of graphs of the average conversion efficiency for the various combinations of diffraction orders as a function of the amplitude of deformation. The average conversion efficiency is represented in percent along the ordinate, and amplitude in terms of the aforementioned parameter Z is plotted along the abscissa. For the proper operation of the system of FIG. 1 it is necessary for the light modulating medium to retain the diffraction deformations produced therein over a period comparable to the period of a scanning field. Ideally, each point of the light modulating medium should retain the deformation unattenuated until it is subject to a new deformation in response to the modulating signal. Practically, such an ideal situation cannot be met as the charge on the light modulating medium decays and thereby permits the diffraction patterns in the light modulating medium to decay. Under such practical conditions it is desirable for the deformations to decay to a small value over the period of a field of the television scanning process so that new deformation can be applied to the light modulating medium. The average efficiency graphs of FIG. 8 are based on the decay of the deformations to approximately one-third their initial value over the period of a field. Accordingly, even after the electron charge has been deposited by the electron beam to produce the deformation the existence of the deformation continues to diffract the light incident on the medium. Graphs 90, 91, 92, and 93 show, respectively, the average efficiency of the first diffraction order, the sum of the first and second orders, the sum of the first and third orders, the sum of the first, second and third orders.

Figure 9:
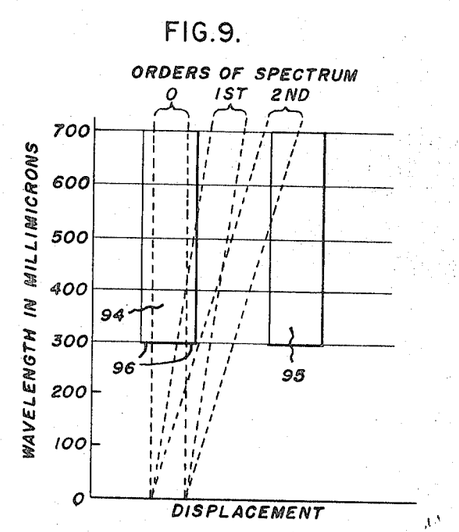
FIG. 9 shows a diagram of a portion of the vertical bars and slots of the output mask of FIG. 5 on which are superimposed various diffraction orders of white light for a particularly chosen grating useful in explaning the present invention.

FIG. 9 is a diagram of the diffraction spectra as they appear at the output bars. For the purpose of illustration the output bars of a central section of the mask of FIG. 5 are used. The abscissa of the diagram represents the horizontal width of the bars and slots and displacement of diffraction spectra. The ordinate represents the wavelengths of light. The dotted pairs of lines designated 0, 1st, 2nd indicate orders of white light. The separation of lines in each pair indicates source width. As shown undeviated light would be completely blocked by the zero order bar 94. First order light diffracted by the monochrome grating formed by the four megacycle carrier is deviated as shown, the wavelengths of light below about 530 millimicrons being progressively blocked and all wavelengths above 530 millimicrons being passed. Similarly, second order light diffracted by such light is entirely passed up to about 550 millimicrons and part of such light being progressively blocked for higher wavelengths of light by bar 95. The line to line spacing of the grating is selected by the use of an appropriate carrier frequency such that substantially all light in the first and second order in the vicinity of 550 millimicrons, the wavelengths to which the eye is most sensitive, is passed. From the diagram of FIG. 8 it is readily apparent that a system which utilizes only first order light is approximately 40% efficient whereas a system that uses first and second order light is nearly 60% efficient. Thus the system illustrated using first and second order of diffraction is approximately 50% more efficient than a system using first order diffracted light. It should also be noted in connection with FIG. 8 that the portion of the first order spectrum which is blocked by bar 94 is at the blue end and that the portion of the second order spectrum which is blocked by bar 95 is at the red end of the spectrum. With the arrangement shown the blockages are complementary and thus coloring of the monochrome image is minimized. The system such as illustrated in connection with FIG. 9 is described and claimed in copending U.S. patent application Ser. No.

419,396, filed Dec. 18, 1964, now Pat. 3,308,230, and assigned to the assignee of the present invention.

In FIG. 9 the bands or extensions 96 of the bar beyond the edges of the zero order light are referred to as guard bands and are provided to allow for deviations produced in the zero order light resulting from variations in the tolerances of the various optical components of the system as well as for imperfection in alignment of these components and also for allowance for aberrations produced by the lens system. In the aforementioned patent application the input slots on the input mask are all made of the same width. Also the output bars in the output mask are made of the same width. Thus in effect the same guard bands for each of the bars is provided. We have found that the guard band requirement for each bar as well as the guard band requirement along the length of the bar to provide a good dark field is different. We have observed that aberrations produced by the lens system are greater for light sources in the object plane at greater displacements from the optical axis of the system. Thus guard bands in the output mask for the bars spaced at greater distances from the optical axis of the system as well as for portions of a bar displaced at greater distances from the optical axis of the system would have to be greater to provide for blockage of light under zero modulation conditions. Conversely for output bars that are closer to the optical axis and portions of such bars which are closer to the optical axis less guard band on either side thereof is required to provide the desired blockage of aberrations in zero order light. In effect the guard bands of the latter bars can be made narrow. Thus without impairing the operating performance of the system more light can be passed therethrough thereby increasing the light efficiency of the system.

Figure 10A:
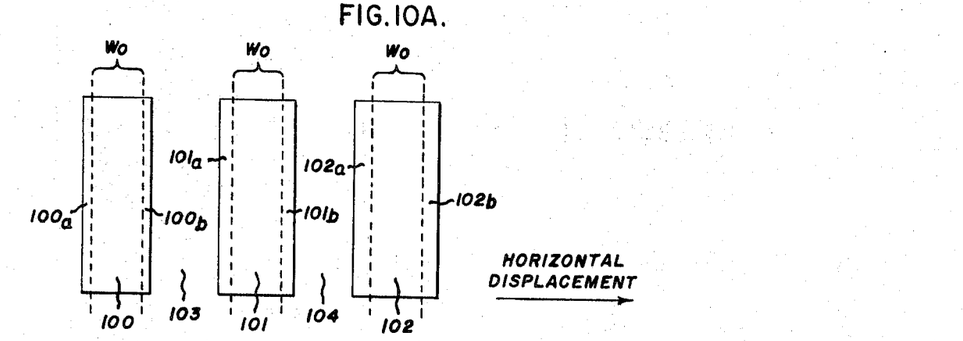
FIGS. 10A, 10B, and 10C show diagrams of the vertical slots and bars of the input and output masks of FIGS. 1 and 5 illustrating various embodiments of a system in accordance with the present invention.
Figure 10B:
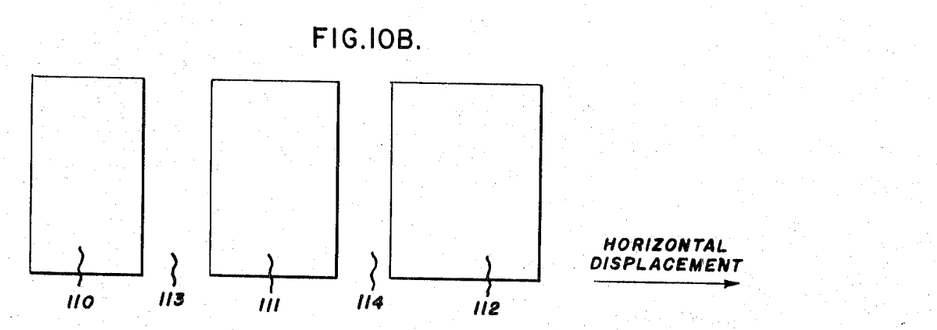
Figure 10C:
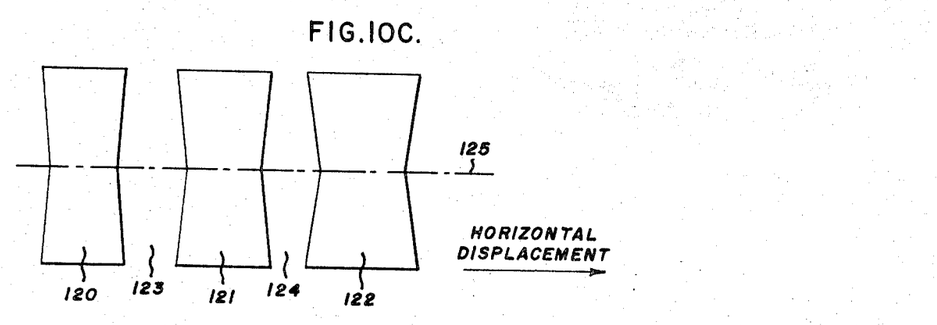

FIGS. 10A through 10C illustrate alternative forms of the present invention. FIG. 10A shows a portion of the bars and slots of a central section of the output mask of FIGS. 1 and 5. Conveniently three bars 100, 101 and 102 and two slots 103 and 104 are shown. FIG. 10A shows the position of the image of zero order white light $W_0$ perfectly imaged on each of the bars from a respective slot source in the input mask. In this figure the guard band portions of the bar are made of sufficient extent to block the deviations in zero order light produced by variations in tolerances in the system, imperfect alignment of such components and for aberrations produced by the lens system for imaging light from the input slots onto the output bar. Such guard bands can be quite small for a bar situated near the optical axis of the lens system, such as bar 100, as aberrations such as the aberrations of coma, astigmatism, and lateral color are small for light sources located in the object plane of a lens system close to the optical axis. The bands 100a and 100b are guard bands for bar 101a and 101b of bar 101 are made a little larger as the aberrations for zero order light imaged on such a bar are a little greater than for the aberrations produced in the zero order light imaged on bar 100. Also the guard bands designated 102a and 102b on bar 102 are made a little larger than the guard bands on bar 101. Thus areas in prior art system where guard bands were used of uniform extent and of such extent as to correct for the worst aberration condition it is seen that excessive blocking of useful light occurred. With the arrangement of FIG. 10A the same performance is obtained with regard to good dark field, i.e., no transmission of light in the absence of modulation while at the same time improved light efficiency is obtained in the system. Thus to make use of the aspect of the invention illustrated in FIG. 10A the output bars starting with the output bar at the optical center is provided with guard bands which are made progressively greater for bars which are spaced a progressive distance from the optical axis.

The same result as achieved in connection with the guard band extent and disposition in FIG. 10A may be accomplished by leaving the bar widths and the output bars of a predetermined uniform extent while altering the widths of the slot source in the input mask as illustrated in FIG. 10B. In this figure are shown a portion of the bars and slots of the input mask of FIGS. 1 and 3. Conviently three bars 110, 111 and 112 and two slots 113 and 114 are shown. In this figure slot 113 closest to the optical axis of the system is made of predetermined width to provide good passage of light therethrough, and correspondingly the bar in the output mask on which the light is imaged is provided with the required guard band. The next slot 114 more remote from the optical axis of the system is made a little narrower. Thus when such slot 114 is imaged on a corresponding bar in the output mask the zero order image is of smaller width and as such output bar is of the same width as the output bar for the slot 113, and effectively larger guard band is provided. While the input slots progressively removed from the optical axis of the system are progressively narrower it would appear that less light would be transmitted therethrough. However, in the lenticulated system of FIG. 1 very little is lost because the source images from the arc source decrease in size toward the edges of the second lenticular plate due to changes of magnification of the reflector system.

FIG. 10C shows a section of the output mask of FIG. 5 in which the output bars are provided with guard bands which not only vary with the lateral position of the bars with respect to the optical axis but also vary from a central portion thereof over the length thereof. This figure shows three bars 120, 121, and 122 and two slots 123 and 214. Bar 120 is the bar nearest the optical axis and bar 122 is the bar farthest from the optical axis. The center line 125 through the bars represents the horizontal center line through the optical axis of the system. Along the center line bar 120 is made a width providing a sufficient guard band to block light produced by the causes indicated. Bar 121 and bar 122 are made progressively wider along such center line. In addition, as the deviation of light resulting from aberrations in the lens system increases in both directions along a vertical from the center line, each of the bars 120, 121, and 122 are provided with progressively larger guard bands in these directions to provide blockage of light from such causes.

It will be appreicated in accordance with the invention that various combinations of the techniques illustrated in FIGS. 10A through 10C may be utilized to accomplish the purpose of the invention which is to provide good dark field under zero modulation conditions and at the same time to increase the overall optical efficiency of the system. For example, the construction illustrated in FIG. 10B could be used for the input mask, and concurrently the construction illustrated in FIG. 10A could be used for the output mask. Of course, in such case depending on the proportion of the blockage of undeviated light which it is desired to correct for in the input and output mask the progressive decrease in slot width can be made, for example, one-half, and correspondingly the bars of the output mask can be progressively increased, however, now reduced by the factor of one-half that used in connection with FIG. 10A. Also, of course, a construction such as shown in FIG. 10C with slot width varying along the vertical as well as along the horizontal axis could be used for the input mask. The output mask then would be designed to provide just sufficient guard band on the bar structure. Such structure could take the form of FIG. 10C or a bar structure of constant guard band or any other suitable form. The techniques illustrated can be applied to only a portion of the slots of the input mask and the bars of the output mask where the aberrations are most severe.

An advantage of using the technique of FIG. 10B in addition to that mentioned is that good resolution in the projected image is maintained as the slots of the output mask are not altered. The invention has been described with bars of the output mask and corresponding slots of the input mask oriented perpendicular to the raster lines. It will be appreciated that the bars of the output mask oriented parallel to the raster lines and the corresponding slots in the input mask may as well be modified in the manner indicated. Of course, they may be used in both vertical and horizontal slots in a system in which such slots are simultaneously used for the projection of color images, for example in the system described in U.S. patent specification Ser. No. 384,955, filed July 24, 1964, and assigned to the assignee of the present invention.

It will be appreciated that in some mask lens systems the aberrations will vary in a manner other than described and accordingly appropriate allowance must be made therefor in the input and output masks of the system. It will also be appreciated that the invention is applicable to input and output mask systems constituted of other geometries than parallel slots and bars, for example arrays of circular openings.

While the invention has been described in specific embodiments, it will be appreciated that many modifications may be made by those skilled in the art, and we intend by the appended claims to cover all such modifications and changes as fall within the true spirit and scope of the invention.

What we claim as new and desire to secure by Letters Patent of the United States is:

1. A system for controlling the intensity of each point of a beam of light in response to a respective point in an electrical signal for projecting an image corresponding to said electrical signal comprising:
   a light modulating medium,
   a first mask having a plurality of parallel transparent slots separated by a plurality of opaque bars,
   means to image light from said beam through said parallel slots onto said medium,
   means for producing a set of deformations in said medium to form light diffraction gratings have uniformly spaced lines extending in the same direction parallel to the direction of said slots of light,
   means for controlling the amplitude of the lines of deformation of said grating in response to said electrical signal,
   a second mask having a plurality of parallel opaque bars separated by a plurality of parallel transparent slots,
   a lens system for imaging each of said plurality of slots of said first mask through said medium onto a respective opaque bar of said secoind mask in the absence of deformations in said modulating medium,
   a slot of said first mask and a corresponding opaque bar of said second mask being proportioned such that the zero order image of said slot of said first mask is imaged on a portion of said corresponding opaque bar and adjacent portions of said corresponding bar are of just sufficient width to block light from said slot due to imperfections in the alignment of the elements in the lens system and aberrations produced by said lens system,
   each of said bars having a portion which is as large as the zero order image of a corresponding slot of said first mask and another portion on each side of said one portion of sufficient extent to block light produced by inaccuracies of lens alignment and aberrations produced by the lens system,
   said other portions of said opaque bars of said second mask successively displaced from the axis of the lens system being progressively larger.

2. A system for controlling the intensity of each point of a beam of light in response to a respective point in an electrical signal for projecting an image corresponding to said electrical signal comprising:
   a light modulating medium,
   a first mask having a plurality of parallel transparent slots separated by a plurality of opaque bars,
   means to image light from said beam through said parallel slots onto said medium,
   means for producing a set of deformations in said medium to form light diffraction gratings having uniformly spaced lines extending in the same direction parallel to the direction of said slots of light,
   means for controlling the amplitude of the lines of deformation of said grating in response to said electrical signals,
   a second mask having a plurality of parallel opaque bars separated by a plurality of parallel transparent slots,
   a lens system for imaging each of said plurality of slots of said first mask through said medium onto a respective opaque bar of said second mask in the absence of deformations in said modulating medium,
   a slot of said first mask and a corresponding opaque bar of said second mask being proportioned such that the zero order image of said slot of said first mask is imaged on a portion of said corresponding opaque bar and adjacent portions of said corresponding bar are of just sufficient width to block light from said slot due to imperfections in the alignment of the elements in the lens system and aberrations produced by said lens system,
   each of said bars having a portion which is as large as the zero order image of a corresponding slot of said first mask and another portion on each side of said one portion of sufficient extent to block light from said slot due to imperfections in the alignment of the elements in the lens system and aberrations produced by said lens system,
   said slots of light of said first mask successively displaced from the axis of the lens system being progressively narrower.

3. A system for controlling the intensity of each point of a beam of light in response to a respective point in an electrical signal for projecting an image corresponding to said electrical signal comprising:
   a light modulating medium,
   a first mask having a plurality of parallel transparent slots separated by a plurality of opaque bars,
   means to image light from said beam through said parallel slots onto said medium,
   means for producing a set of deformations in said medium to form light diffraction gratings having uniformly spaced lines extending in the same direction parallel to the direction of said slots of light,
   means for controlling the amplitude of the lines of deformation of said grating in response to said electrical signal,
   a second mask having a plurality of parallel opaque bars separated by a plurality of parallel transparent slots,
   a lens system for imaging each of said plurality of slots of said first mask through said medium onto a respective opaque bar of said second mask in the absence of deformations in said modulating medium,
   a slot of said first mask and a corresponding opaque bar of said second mask being proportioned such that the zero order image of said slot of said first mask is imaged on a portion of said corresponding opaque bar and adjacent portions of said corresponding bar are of just sufficient width to block light from said slot due to imperfections in the alignment of the elements in the lens system and aberrations produced by said lens system,
   the width of each of said bars increasing along the length thereof with respect to a center axis thereof.

4. A system for controlling the intensity of each point of a beam of light in response to a respective point in an electrical signal for projecting an image corresponding to said electrical signal comprising:
   a light modulating medium,
   a first mask having a plurality of parallel transparent slots separated by a plurality of opaque bars, means to image light from said beam through said parallel slots onto said medium, means for producing a set of deformations in said medium to form light diffraction gratings having uniformly spaced lines extending in the same direction parallel to the direction of said slots of light, means for controlling the amplitude of the lines of deformation of said grating in response to said electrical signal, a second mask having a plurality of parallel opaque bars separated by a plurality of parallel transparent slots, a lens system for imaging each of said plurality of slots of said first mask through said medium onto a respective opaque bar of said second mask in the absence of deformations in said modulating medium, a slot of said first mask and a corresponding opaque bar of said second mask being proportioned such that the zero order image of said slot of said first mask is imaged on a portion of said corresponding opaque bar and adjacent portions of said corresponding bar are of just sufficient width to block light from said slot due to imperfections in the alignment of the elements in the lens system and aberrations produced by said lens system, the width of each of said bars increasing along the length thereof with respect to a center axis thereof, the width of the central section of the bars successively displaced from the axis of the lens system being progressively larger.

5. A system for controlling the intensity of each point of a beam of light in response to a respective point in an electrical signal for projecting an image corresponding to said electrical signal comprising:

a light modulating medium, a first mask having a plurality of parallel transparent slots separated by a plurality of opaque bars, means to image light from said beam through said parallel slots onto said medium, means for producing a set of deformations in said medium to form light diffraction gratings having uniformly spaced lines extending in the same direction parallel to the direction of said slots of light, means for controlling the amplitude of the lines of deformation of said grating in response to said electrical signals, a second mask having a plurality of parallel opaque bars separated by a plurality of parallel transparent slots, a lens system for imaging each of said plurality of slots of said first mask through said medium into a respective opaque bar of said second mask in the absence of deformations in said modulating medium, a slot of said first mask and a corresponding opaque bar of said second mask being proportioned such that the zero order image of said slot of said first mask is imaged on a portion of said corresponding opaque bar and adjacent portions of said corresponding bar are of just sufficient width to block light from said slot due to imperfections in the alignment of the elements in the lens system and aberrations produced by said lens system, each of said bars having a portion which is as large as the zero order image of a corresponding slot of said first mask and another portion on each side of said one portion of sufficient extent to block light from said slot due to imperfections in the alignment of the elements in the lens system and aberrations produced by said lens system, said slots of light of said first mask successively displaced from the axis of the lens system being progressively narrower, the width of each of said slots decreasing along the length thereof with respect to a center axis thereof.

References Cited
UNITED STATES PATENTS 3,305,630 2/1967 Good et al. ........... 178—5.4
3,320,852 5/1967 Parrent et al. ........... 88—24

ROBERT L. RICHARDSON, Primary Examiner

U.S. Cl. X.R.

178—5.4